United States Patent [19]

Pape et al.

[11] 4,231,691
[45] Nov. 4, 1980

[54] DUAL CUTTER BORING HEAD

[75] Inventors: Dieter Pape; Hans Woerz, both of Rümlang, Switzerland

[73] Assignee: Heinz Kaiser AG, Rümlang, Switzerland

[21] Appl. No.: 951,325

[22] Filed: Oct. 16, 1978

[30] Foreign Application Priority Data

May 11, 1978 [CH] Switzerland .......................... 5156/78

[51] Int. Cl.³ .............................................. B23B 27/00
[52] U.S. Cl. ..................... 408/185; 408/190; 408/198; 407/39; 407/71; 407/75
[58] Field of Search ............... 408/185, 181, 182, 157, 408/190, 197, 198, 239 R; 407/35, 43, 45, 38, 39, 70, 71, 75, 87

[56] References Cited

U.S. PATENT DOCUMENTS

| 3,332,130 | 7/1967 | Armstrong | 407/45 |
| 3,625,624 | 12/1971 | Fitzimmons | 408/197 |
| 3,730,636 | 5/1973 | Mizoguchi | 408/185 |
| 4,101,239 | 7/1978 | Wohlhaupter | 408/182 |

Primary Examiner—Leonidas Vlachos
Attorney, Agent, or Firm—Weiser, Stapler & Spivak

[57] ABSTRACT

The head has a transverse groove in its leading face in which two cutting blade holders with interchangeable cutting blades are clamped by means of a set screw. After loosening of the set screw, the cutting blade holders can be radially and axially adjusted by means of adjusting screws. This enables precise positioning of the cutting blades, to eliminate unequal chip formation, and rough operation due to unequal loading of the blades.

4 Claims, 5 Drawing Figures

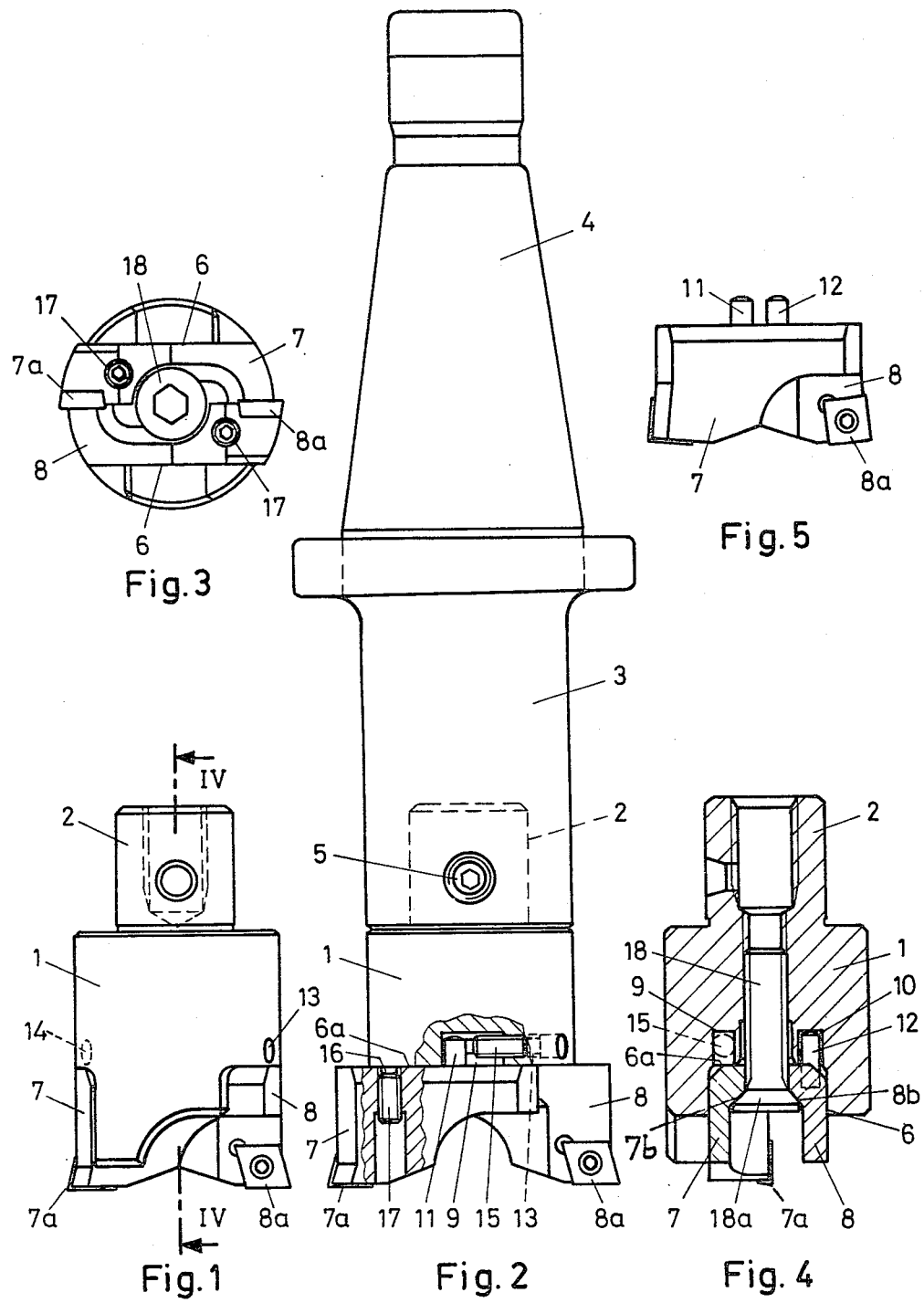

DUAL CUTTER BORING HEAD

The invention relates to dual cutter boring heads having cutting blade holders attached in a transverse slot found in the lead face of the head and radially displaceable by means of adjusting screws. Boring heads of this general type are known. Such a tool is described, for example, in German patent publication (Offenlegungsschrift) No. 2,625,983.

In this tool, the cutters can be displaced radially, and fixed in any desired position. However, smooth work processing is possible, for tools having two or more cutters, only when the individual cutters are precisely adjusted in the axial direction, that is in the direction of advance. Even a slight displacement of individual cutters in the axial direction produces an unequal loading thereof. This can lead to rough operation, non-uniform chip formation, and overloading of the tool.

Accordingly, it is an object of this invention to form a two-cutter boring head of the originally described type, in such a manner that each cutter can also be individually adjusted in the axial direction.

This and other objects which will appear are achieved by an arrangement having additional adjusting screws bearing upon the bottom surface of the groove for axially displacing the respective cutting blade holders.

From German patent publication (Offenlegungsschrift) No. 2,321,551 there is indeed known a rotating head with plural cutters, in which the two rotating chippers are inclined by the same amount relative to the longitudinal axis of the tool and are displaceable. This indeed makes possible their displacement in an axial direction, but simultaneously causes a displacement in the radial direction.

In the rotating head embodying the invention, an independent displacement of the cutting blades in radial and axial directions is possible. The independent axial displacement capability also permits use of the newest, multiply coated cutting blades. Due to their greater manufacturing tolerances, these are normally not suitable for plural cutter tools which are not capable of adjustment.

There are also disclosed additional advantageous features of the boring head which make possible simple construction and easy adjustment of the cutting blades.

An illustrative example of the invention is shown in the drawings and is explained in further detail with reference thereto. In these drawings FIG. 1 is a side view of the dual cutter boring head, FIG. 2 shows partially sectioned the same boring head as FIG. 1, attached to a connecting arbor, and with the cutting blades adjusted to the greatest diameter, FIG. 3 is a face view of the head of FIG. 1, FIG. 4 is a cross-section of FIG. 1 taken along line IV—IV, and FIG. 5 is a side view of the two cutting blade holders, but with different cutting blades than in FIGS. 1 and 2.

The rotating head includes a main body 1, to which there is connected a cylindrical attachment plug 2. The latter fits into a recess in connecting arbor 3 with tapered attachment section 4, to which it is attached in known manner by means of a set screw 5. The connecting arbor 3 does not form part of the invention. Its construction is described, for example, in Swiss Pat. No. 537,770. The main body 1 has in its exposed leading face a transverse slot 6, in which are inserted two identical cutting blade holders 7 and 8. To each cutting blade holder 7 or 8 there is bolted an interchangeable cutting blade 7a or rather 8a, these being also known as reversible blades.

In the bottom surface 6a of groove 6 there are two parallel, longitudinal recesses 9, 10, into which there extends respectively a cylindrical pin 11, 12, anchored in its respective cutting blade holder 7 or 8 (see FIGS. 2, 4 and 5). The recesses 9 and 10 limit the radial adjustability of the cutting blade holders 7, 8. In the extension of the longitudinal axis of recesses 9 and 10, there is provided respectively a threaded recess 13 and 14 within the main body 1. In each of these holes 13, 14, a set screw 15 is positioned, which acts upon the cylindrical pins 11 and 12, respectively. By turning of the adjusting screws 15, the cutting blade holders can therefore be displaced radially outwardly.

Each cutting blade holder 7, 8 further includes a hole which extends parallel to the longitudinal axis of the tool and which is partially provided with a threaded inner surface 16. In it there is an adjusting screw 17, which bears upon the bottom surface 6a of groove 6. FIG. 2 shows the adjusting screw 17 for cutting blade holder 7. By turning of the adjusting screws 17, the cutting blade holders 7, 8 can be displaced in the axial direction. This displacement is limited to a few tenths of a millimeter and serves to achieve identical cutting conditions for both cutting edges.

A central set screw 18 serves to fix in position the cutting blade holders 7 and 8 after their radial and axial adjustment. The set screw 18 has a head with a conical surface 18a which acts through corresponding surfaces 7b and 8b upon the cutting blade holders 7, 8. The head of the set screw 18 simultaneously urges both cutting blade holders 7 and 8 against the lateral surfaces and against the bottom surface 6a of groove 6. This tensioning technique is non-sensitive to unequally high pressures, created by axial displacement, because the set screw 18 can accommodate within the limits of the thread pattern.

The boring head described above can be used not only when the cutting blades 7a, 8a are adjusted to equal diameter and height. It is also possible to set one cutting blade to the diameter to be machined, and the other cutting blade to a smaller diameter, in which case the latter is positioned farther forward by at least the distance of work advance. By so doing, there is achieved, for example in the production of through-holes, a more desirable chip cross-section and reduced load.

We claim:

1. A dual cutter rotating boring head, having two cutting blade holders attached in a transverse slot provided in the exposed leading face of the head, comprising:

a pair of adjusting screws disposed within said slot, said adjusting screws being positioned to push said blade holders in a radial direction, each blade holder comprising an additional adjusting screw and the axis of said additional adjusting screw being parallel to the longitudinal axis of said boring head, said additional adjusting screws bearing upon the bottom surface of the slot and pushing said blade holders in an axial direction, and the two cutting blade holders being adapted to be firmly clamped in any position by means of a set screw positioned co-axially with respect to the head.

2. The head of claim 1 wherein the bottom surface of the slot has two longitudinal recesses into which there extend pins anchored in the cutting blade holders, and the main body of the rotating head has holes, and adjusting screws within the holes, which cooperate with the pins to provide radial displacement of the cutting blade holders.

3. The head of claim 1 wherein said set screw is the sole means for clamping said blade holders to said head.

4. A dual cutter rotating boring head, having two cutting blade holders attached in a transverse slot provided in the exposed leading face of the head, comprising:

a pair of adjusting screws disposed within said slot, said adjusting screws being positioned to push said blade holders in a radial direction, each blade holder comprising an additional adjusting screw and the axis of said additional adjusting screw being parallel to the longitudinal axis of said boring head, said additional adjusting screws bearing upon the bottom surface of the slot and pushing said blade holders in an axial direction, and the two cutting blade holders being adapted to be firmly clamped in any position by means of a set screw positioned co-axially with respect to the head, wherein the set screw has a head having a conical surface which bears upon correspondingly inclined surfaces of the two cutting blade holders.

* * * * *